May 23, 1933.  C. H. HAPGOOD  1,910,830
MILKING MACHINE
Filed July 15, 1929   2 Sheets-Sheet 1

WITNESS:
Rob R Kitchel.

INVENTOR
Cyrus Howard Hapgood
BY
Busser and Harding
ATTORNEYS.

May 23, 1933.   C. H. HAPGOOD   1,910,830
MILKING MACHINE
Filed July 15, 1929    2 Sheets-Sheet 2

INVENTOR
Cyrus Howard Hapgood
BY
ATTORNEYS.

WITNESS:

Patented May 23, 1933

1,910,830

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed July 15, 1929. Serial No. 378,216.

In an application filed by me February 2, 1929, Serial No. 336,998, I set forth a milking machine which is believed to be novel with respect to certain broad combinations as well as with respect to certain features included in such combinations. The specific construction therein disclosed as a preferred embodiment of the invention may be briefly described as follows:

A milk pail is suspended from a weighing device located between two stalls into each of which cows, one by one, are led and, after being milked, are led therefrom. The milk pail is provided with a milk inlet and a milk outlet and with an air port through which air is exhausted during milking, air being admitted through the milk inlet to effect the discharge of the milk. From said milk inlet, milk outlet and air port and also from the milk chambers of the teat cups, conduits extend to a main control valve, from which also extends a milk pipe communicating with a stationary milk reservoir located, preferably, in another building. The pulsation chambers of the teat cups are connected, directly or through an udder pulsator, with a pipe leading to a vacuum pipe line. An electrically operable secondary pulsator connects the last named pipe alternately with the vacuum in the vacuum pipe line and with atmosphere.

The main control valve is movable into three positions. In one extreme position the main control valve connects the milk conduit from the teat cup chambers with the milk conduit to the pail and at the same time connects the air conduit to the pail with the vacuum pipe line. In the other extreme position the main control valve connects the milk conduit to the pail with the atmosphere and at the same time connects the milk outlet conduit from the paid with the milk pipe line leading to the milk reservoir. When moved to an intermediate position the valve closes communication between the pail and the teat cups, milk pipe line and atmosphere.

The present invention has for its object to so modify the milking machine above briefly described as to substitute a portable outfit for an outfit which is bodily stationary, so that the entire machine, except the vacuum pump, vacuum pipe line and primary electric pulsator, may be moved from stall to stall; the machine being brought to the cows instead of bringing the cows to the machine. There is, of course, nothing novel, broadly, in a portable milking machine; the novelty residing in the adaptation of the features of novelty and utility characterizing the invention of my said application to a portable machine, thereby securing the advantages of said invention together with other advantages that inhere in a machine which is readily portable and still other advantages that will appear from the following description.

The main vacuum pipe line $b$ extends through the cow barn and connects with a vacuum pump, which operates a primary electric pulsator, the latter transmitting electric pulsations (preferably by alternately making and breaking an electric circuit) through an electric conductor $a$ extending along the vacuum pipe line. The vacuum pump and primary electric pulsator are not shown, since they are known elements of a milking machine and form no part of the present invention.

At spaced intervals along the vacuum pipe line $b$, say opposite successive pairs of stalls, are branch vacuum pipes $c$, which are connectible through a hose $d$ with a vacuum pipe $e$ forming part of the frame $i$ of the portable milking outfit.

A valve $f$ is provided at the junction of pipe $c$ and hose $d$, the latter being carried by the frame, there being also a valve $g$ at the junction of hose $d$ and vacuum pipe $e$. The valve $g$ may be omitted if desired. Each of the valve casings carries a clamp $h$ for securing the conductor $a$.

The frame $i$ is mounted on wheels and carries a milk receiving tank or milk reservoir $k$. Tank $k$ is of such size and shape that it can be readily handled. For example, it is preferably a standard 40 quart milk can in which milk is usually shipped. A hose $j$ connects the vacuum pipe $e$ with the top of tank $k$. The dome on the top of tank $k$ has a check valve to prevent breaking the vacuum in the tank when hose $d$ is disconnected from valve $f$, as shown in the Hapgood Patent No. 1,421,773, July 4, 1922.

Figure 2:
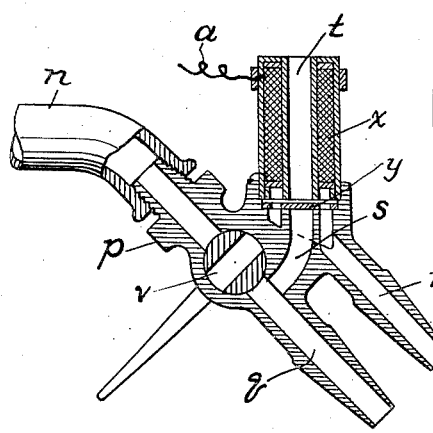
Fig. 2 is a sectional view of the magnetically actuated pneumatic pulsator and connections.

On an upwardly projecting part of the frame $i$ is suspended a laterally swingable yoke frame $w$, to which are clamped a laterally extending milk pipe $m$ and a laterally extending vacuum pipe $n$, the latter having a hose connection $o$ with vacuum pipe $e$. The reach of tubes $m$ and $n$ may be lengthened or shortened by sliding them through the clamp in frame $w$. The outer end of the vacuum pipe $n$ carries a connector $p$ having air conduits $q$, $r$, $s$, $t$ (see Fig. 2). Interposed in conduit $q$ is a valve $v$. Mounted on connector $p$ is an electro-magnet $x$, to which electric current is transmitted through the conductor $a$, which extends from clamp $h$ along vacuum pipe $e$, thence to a binding post $u$ on frame $w$ and thence along pipe $n$ to magnet $x$. The return electric connections are through pipe $n$, frame $w$, the main frame $i$, valve $g$, electric connection $a'$, valve $f$, and pipes $c$ and $b$. (For a more particular description of the electric connection between valves $f$ and $g$, see the application filed by me December 24, 1927, Serial No. 242,329). When valve $v$ is open and when the electric circuit is closed through wire $a$, the magnet armature $y$, which is perforated and functions also as a valve, lifts and connects conduit $r$, through conduits $s$ and $q$, with the vacuum pipe $n$. When the circuit through the magnet is opened, the armature valve $y$ drops and connects conduit $r$, through conduit $t$, with atmosphere. It will thus be understood that when valve $v$ is open, conduit $q$ is under constant suction and conduit $r$ is subjected to pneumatic pulsations.

Hose 2 and 3 are connected with conduits $q$ and $r$ respectively. These hose are connected to the pulsation chamber of a claw 4, which may be of the type shown in the Leitch Patent 1,255,186, February 5, 1918. The pulsation chamber of the claw may contain a claw or udder pulsator (not shown) operable by the pulsations in hose 3 and which connects the tubes 5 (which extend to the pulsation chambers of a set to teat cups 7) alternately with the vacuum hose 2 and with atmosphere. The claw 4 also comprises a milk chamber, which connects through tubes 8, with the milk chambers of a set of teat cups, and which also connects, through a hose 9, with the milk pipe $m$.

Suspended from a bracket 52 on frame $i$ are scales 51, from which is suspended a milk receiver 50, which, for convenience, may be called a milk pail. This pail is preferably constructed, in detail, as disclosed in my prior application; but the detailed construction is not herein described, since it forms no part of the present invention.

Figure 3:
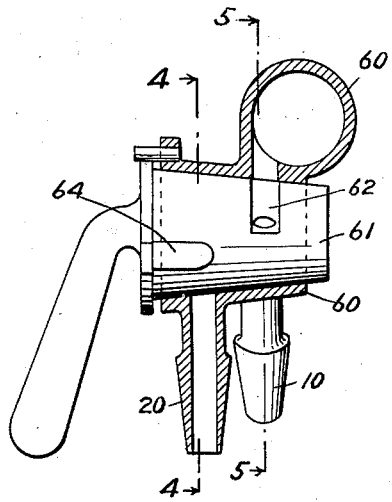
Fig. 3 is a longitudinal sectional view of the main control valve.

A valve casing 60, which is conveniently supported on vacuum pipe $e$, carries nipples 10, 20, 30 and 40. See Figs. 3, 4, and 5. Turnable in the valve casing is a plug valve 61 provided with channels 62, 63, 64, one of which, 62, is always open to a port 65 in the chamber formed in the upper part of valve casing 60. This chamber has a nipple to which is attached a hose 45 leading to the upper part of the milk receiving tank $k$. Nipple 10 is connected, through a milk hose 11, with a nipple on the bottom of pail 50. Nipple 20 is connected, through a milk hose 21, with the milk pipe $m$. Nipple 30 is connected, through an air hose 31, with an air port in the cover of the milk pail 50. Nipple 40 is connected, through a hose 41, with the milk inlet in the upper part of the milk pail 50.

Figure 1:
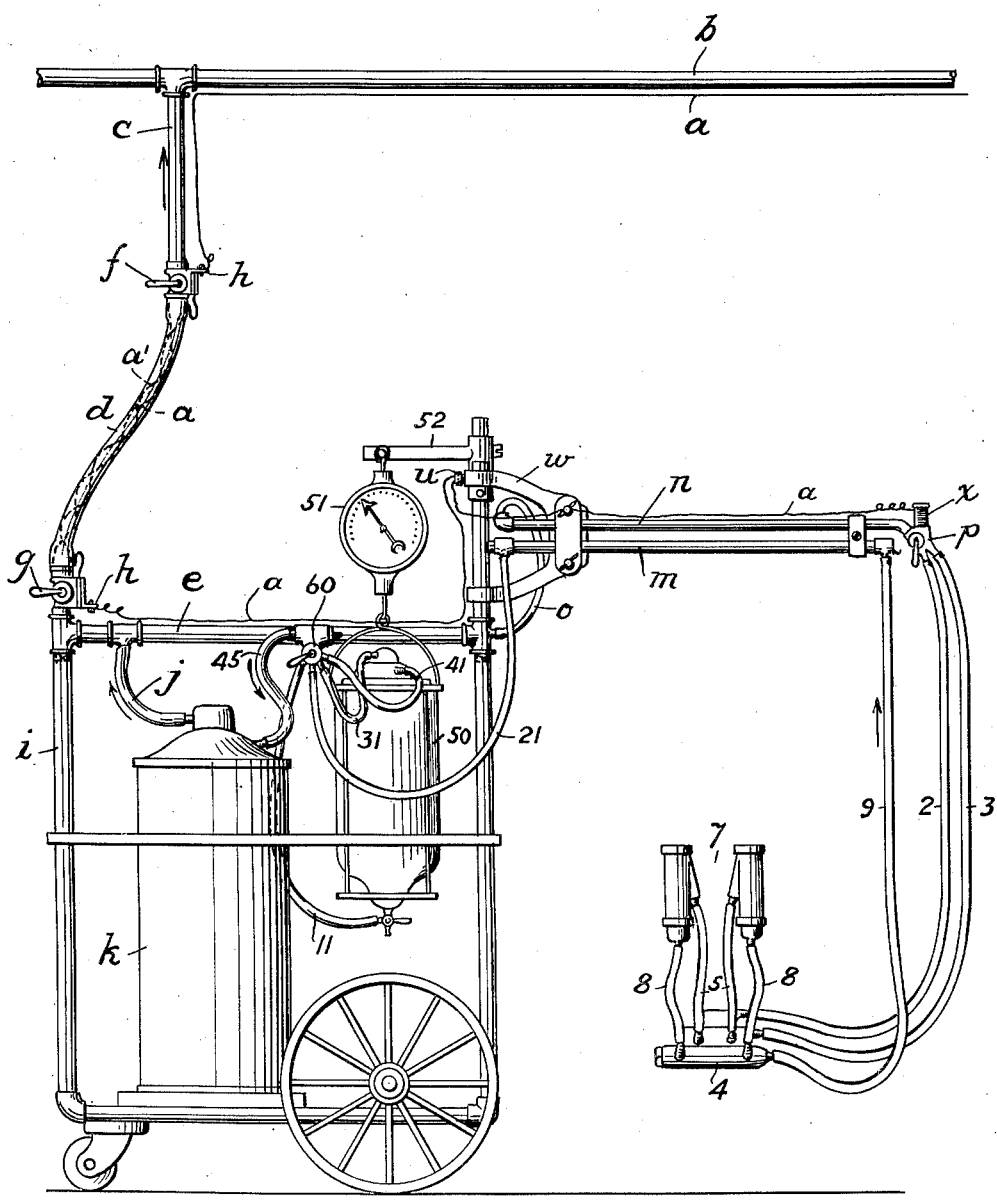
Fig. 1 is a side elevation of a portable milker outfit connected with a fixed vacuum pipe line.
Figure 4:
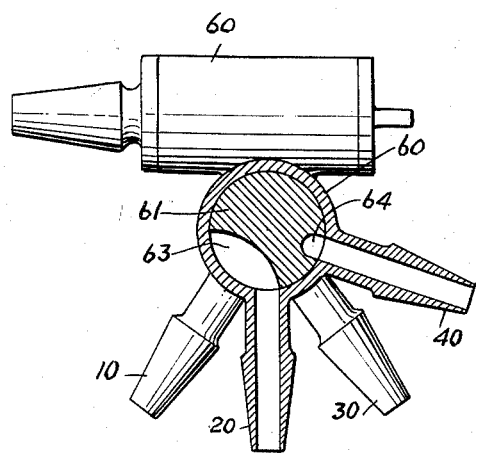
Fig. 4 is a cross section on the line 4—4 of Fig. 3.
Figure 5:
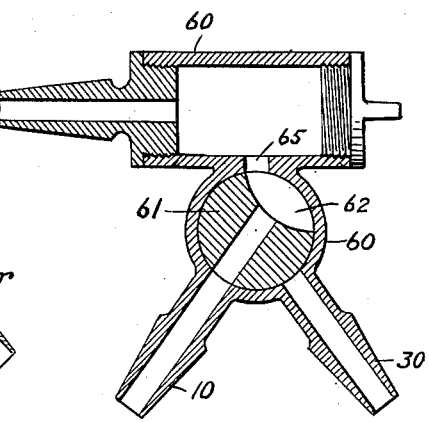
Fig. 5 is a cross section on the line 5—5 of Fig. 3.

When valve 61 is turned to the left hand position shown in Figs. 4 and 5, cavity 62 (which is always open to milk pipe 45) is open to nipple 10, and cavity 64, which communicates with the atmosphere, is open to nipple 40. Nipple 40, being in communication, through hose 41, with the pail cover, the pail is connected at the top with atmosphere. Nipple 10 being in communication, through hose 11, with the bottom of the pail and cavity 62 being in constant communication with milk pipe 45, any milk that is in the milk pail 50 is, under the pressure of the atmosphere above it, forced out of the pail through hose 11, nipple 10, cavity 62, port 65, and milk pipe 45, into the milk receiving tank $k$, which is always under vacuum. Valve 61 is normally turned into this position after the milking of a cow is completed, the milk having previously flowed from the teat cups into the pail 50.

To connect the pail 50 with the teat cups, valve 61 is moved to such position that cavity 63 connects nipples 20 and 40. In this position of valve 61, cavity 62 is open to nipple 30. Nipple 30 being in constant communication, through hose 31, with the cover of pail 50, air is exhausted from the top of the pail through hose 31, nipple 30, cavity 62 and port 65 into the milk pipe 45. Milk flows from the teat cups through tubes 8, the milk chamber of claw 4, milk hose 9, milk pipe m, hose 21, nipple 20, cavity 63, nipple 40, and hose 41 into the top of the pail. This connection is maintained until the milking of the cow is completed.

After the conclusion of the milking operation, valve 61 is turned to an intermediate position. In this position the top of the pail is disconnected from vacuum and the communication between nipples 20 and 40 is closed, so that connection between the teat cups and the pail 50 is cut off, the vacuum established at the top of the pail is maintained, cavity 62 is disconnected from both nipples 10 and 30, and there is no outflow of milk from the pail. This position of the valve may, therefore, be called a neutral position.

When the valve 61 is in the neutral position the weight of the contents of pail 50, as exhibited on scales 51, will be noted.

It should be understood that instead of connecting the upper part of the pail with atmosphere in order to expel the milk from the pail, it may be connected with any other source of pneumatic pressure, and that any relatively high and low pneumatic pressures are the equivalents of atmosphere and vacuum respectively.

While the milking outfit herein described embodies the invention of my prior application hereinbefore mentioned, it has the advantage of being portable and of being adaptable to many installations now in use. The frame carrying the milk pipe m and vacuum pipe n can be swung into positions that will enable the teat cups to be readily applied to the cow.

Having now fully described my invention, what I claim and desire to protect by Letters Patent is:

In a milking machine including a bulk tank for receiving and accumulating milk, a teat cup unit, a milk conduit, a vacuum conduit, a milk receiver, means connecting the bulk receiver with the vacuum conduit, and means to connect the milk receiver alternately with the vacuum conduit and with a source of higher pressure and to connect the milk receiver alternately with the milk conduit and with the bulk receiver; a carriage comprising a rigid frame one member of which is tubular and constitutes part of said vacuum conduit, said frame member comprising also a post, a frame laterally swingable on the post, said vacuum conduit and said milk conduit including a rigid milk tube and a rigid vacuum tube slidably adjustable in said swinging frame to enable the reach of the tubes to be lengthened or shortened, and flexible connections between said tubes and the teat cup unit, said vacuum conduit also including a flexible tube connecting said rigid vacuum tube with said tubular member of the frame.

In testimony of which invention, I have hereunto set my hand, at Philadelphia, Pennsylvania, on this 10th day of July, 1929.

CYRUS HOWARD HAPGOOD.